US008630041B2

(12) United States Patent
Bates et al.

(10) Patent No.: US 8,630,041 B2

(45) Date of Patent: Jan. 14, 2014

(54) DATA STORAGE ASSEMBLY WITH DIAMOND LIKE CARBON ANTIREFLECTIVE LAYER

(75) Inventors: Allen Keith Bates, Tucson, AZ (US); Nils Haustein, Mainz (DE); Craig Anthony Klein, Tucson, AZ (US); Sandra Lynn Waters, Austin, TX (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 12/505,445

(22) Filed: Jul. 17, 2009

(65) Prior Publication Data

US 2011/0013243 A1 Jan. 20, 2011

(51) Int. Cl.
*G02B 1/11* (2006.01)

(52) U.S. Cl.
CPC .................................... *G02B 1/115* (2013.01)
USPC ................................................ 359/586

(58) Field of Classification Search
None
See application file for complete search history.

(56) References Cited

U.S. PATENT DOCUMENTS

| | | | | |
|---|---|---|---|---|
| 3,922,416 | A * | 11/1975 | Ryan | 428/172 |
| 4,329,409 | A * | 5/1982 | Wreede et al. | 430/1 |
| 4,907,846 | A * | 3/1990 | Tustison et al. | 359/359 |
| 5,251,202 | A | 10/1993 | Kaneko et al. | |
| 5,604,611 | A * | 2/1997 | Saburi et al. | 359/13 |
| 5,643,423 | A * | 7/1997 | Kimock et al. | 204/192.35 |
| 5,898,511 | A * | 4/1999 | Mizutani et al. | 359/13 |
| 6,086,962 | A * | 7/2000 | Mahoney et al. | 427/577 |
| 6,416,816 | B2 | 7/2002 | Veerasamy et al. | |
| 6,781,779 | B2 | 8/2004 | Arita et al. | |
| 6,835,523 | B1 | 12/2004 | Yamazaki et al. | |
| 7,094,502 | B2 | 8/2006 | Schaefer et al. | |
| 7,154,838 | B2 | 12/2006 | Kamei et al. | |
| 2003/0165111 | A1 | 9/2003 | Flynn | |
| 2004/0003638 | A1 | 1/2004 | Schaefer et al. | |
| 2005/0250016 | A1* | 11/2005 | Takeyama | 430/1 |
| 2006/0018234 | A1 | 1/2006 | Sugi et al. | |
| 2006/0018237 | A1 | 1/2006 | Sugi et al. | |
| 2008/0028984 | A1 | 2/2008 | Meredith et al. | |

* cited by examiner

*Primary Examiner* — Derek S Chapel
(74) *Attorney, Agent, or Firm* — Dale F. Regelman; Quarles & Brady LLP

(57) ABSTRACT

A data storage assembly is presented. The data storage assembly includes a bi-layered antireflective coating. An inner layer of the antireflective coating includes diamond like carbon. An outer layer is disposed over the inner layer.

23 Claims, 7 Drawing Sheets

DATA STORAGE ASSEMBLY WITH DIAMOND LIKE CARBON ANTIREFLECTIVE LAYER

FIELD OF THE INVENTION

The present invention relates generally to a holographic data storage assembly, and more particularly to a holographic data storage assembly comprising one or more antireflective coatings.

BACKGROUND OF THE INVENTION

In holographic information storage, an entire page of information is stored at once as an optical interference pattern within a, photosensitive optical material. This is done by intersecting two coherent laser beams within the storage material. The first, called the data beam or signal beam, contains the information to be stored; the second, called the reference beam, is designed to be simple to reproduce—for example, a simple collimated beam with a planar wavefront.

The resulting optical interference pattern causes chemical and/or physical changes in the photosensitive medium: a replica of the interference pattern is stored as a change in the absorption, refractive index, or thickness of the photosensitive medium. When later illuminated with one of the waves used to create it, the interference pattern causes some of the incident light to be refracted such that the second wave is recreated. Thus, illuminating the interference pattern with the reference wave reconstructs the data beam, and vice versa.

SUMMARY OF THE INVENTION

In one implementation, a data storage assembly is presented. The holographic data storage assembly comprises a data storage region and a bi-layered antireflective coating. An inner layer of the antireflective coating comprises diamond like carbon. An outer layer is disposed over the inner layer.

In another implementation, a data storage assembly is presented where the data storage assembly comprises a data storage region and a tri-layered antireflective coating. A middle layer of the tri-layered antireflective coating comprises either diamond like carbon, $ZrO_2$; or $Ta_2O_5$.

Another implementation, a data storage assembly is presented where a holographic data storage assembly comprises a data storage region and a layered antireflective coating wherein one of the layers of the antireflective coating comprises either diamond like carbon, $ZrO_2$; or $Ta_2O_5$.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The antireflective coatings of Applicants' invention are described herein as implemented using a holographic data storage assembly comprising a holographic data storage medium. This description should not be interpreted to mean that Applicants' invention is limited to holographic data storage assemblies. Rather, Applicants' antireflective coatings can be used in optical data storage assemblies comprising a read only optical data storage medium, such as are used for example and without limitation in ROM CDs, ROM DVDs, and ROM Blu-Ray Disks ("BD"), a write-once optical data storage medium, such as are used for example and without limitation in +R CDs, −R CDs, +R DVDs, and/or −R DVDs, and a re-writable optical data storage medium, such as are used for example and without limitation in +RW CDs, −RW CDs, +RW DVDs, and/or −RW DVDs.

Figure 1:
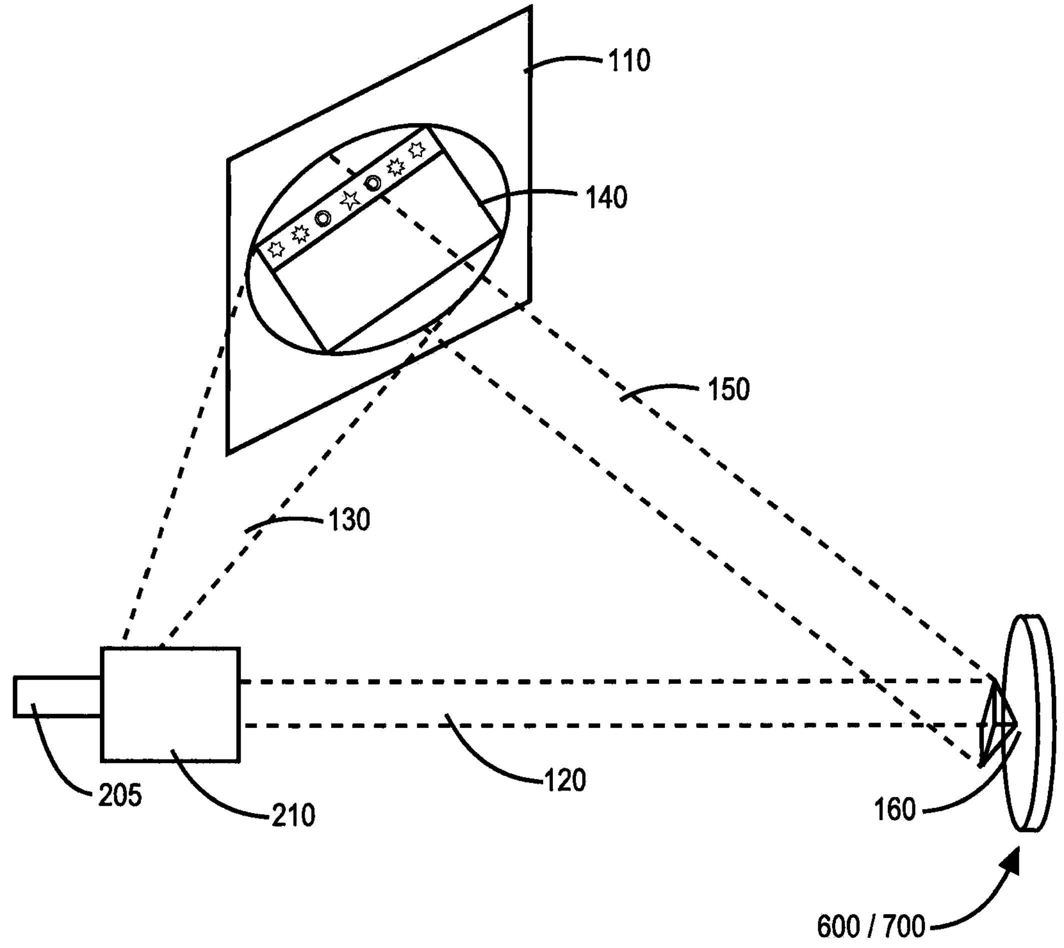
FIG. 1 is a block diagram showing a holographic data storage system being used to encode information in Applicants' holographic data storage assembly.
Figure 2:
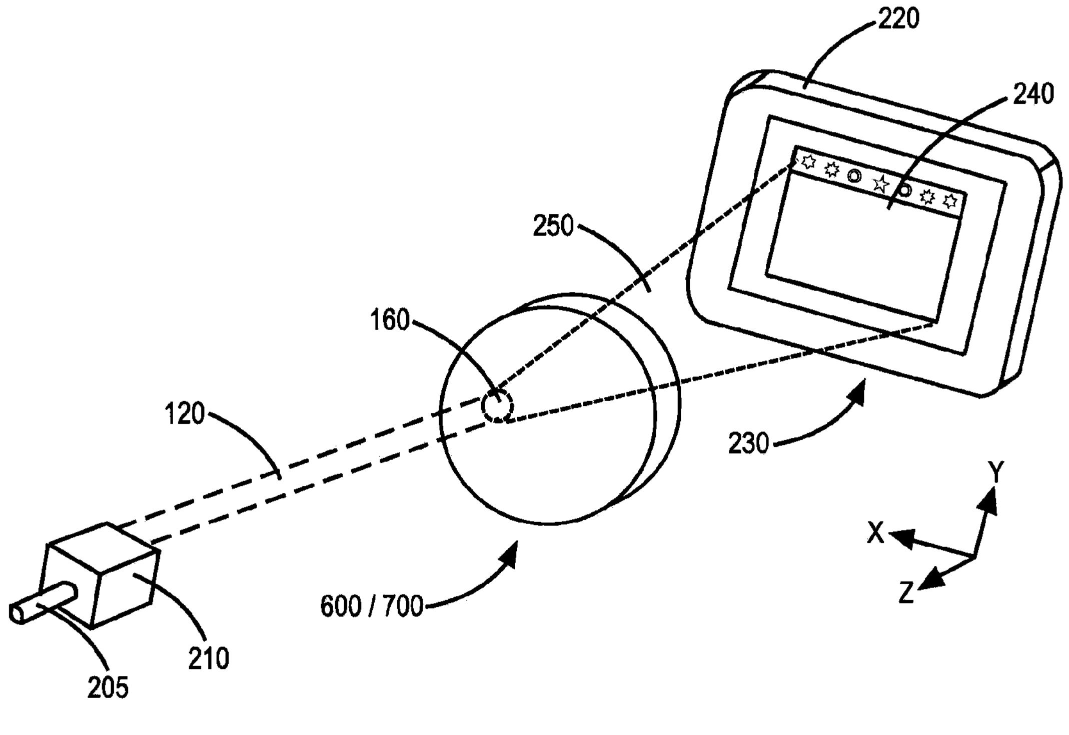
FIG. 2 is a block diagram showing a holographic data storage system being used to decode information encoded in Applicants' holographic data storage assembly.
Figure 3:
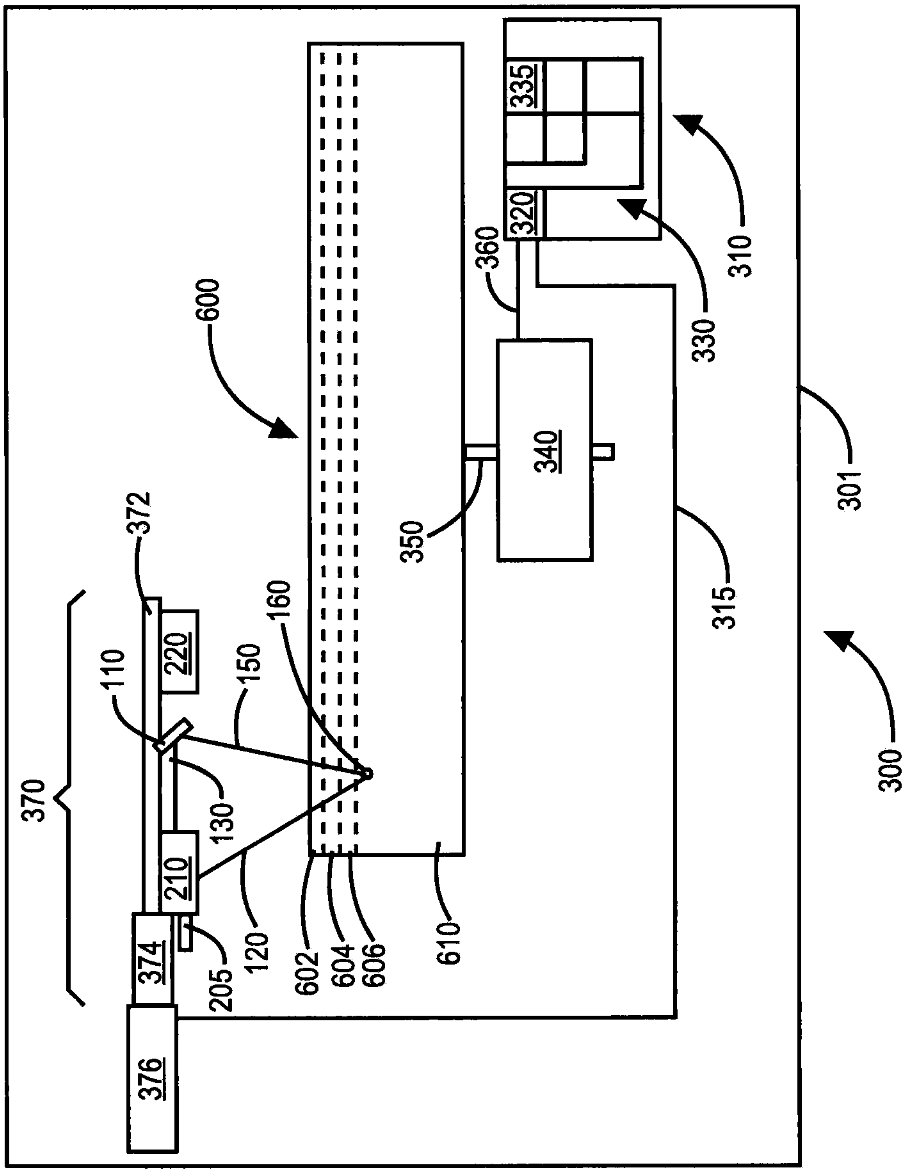
FIG. 3 is a block diagram Applicants' holographic data storage drive, wherein a read/write head is shown using a first lasing device to encode a hologram into a holographic data storage portion of Applicants' holographic data storage assembly.
Figure 4:
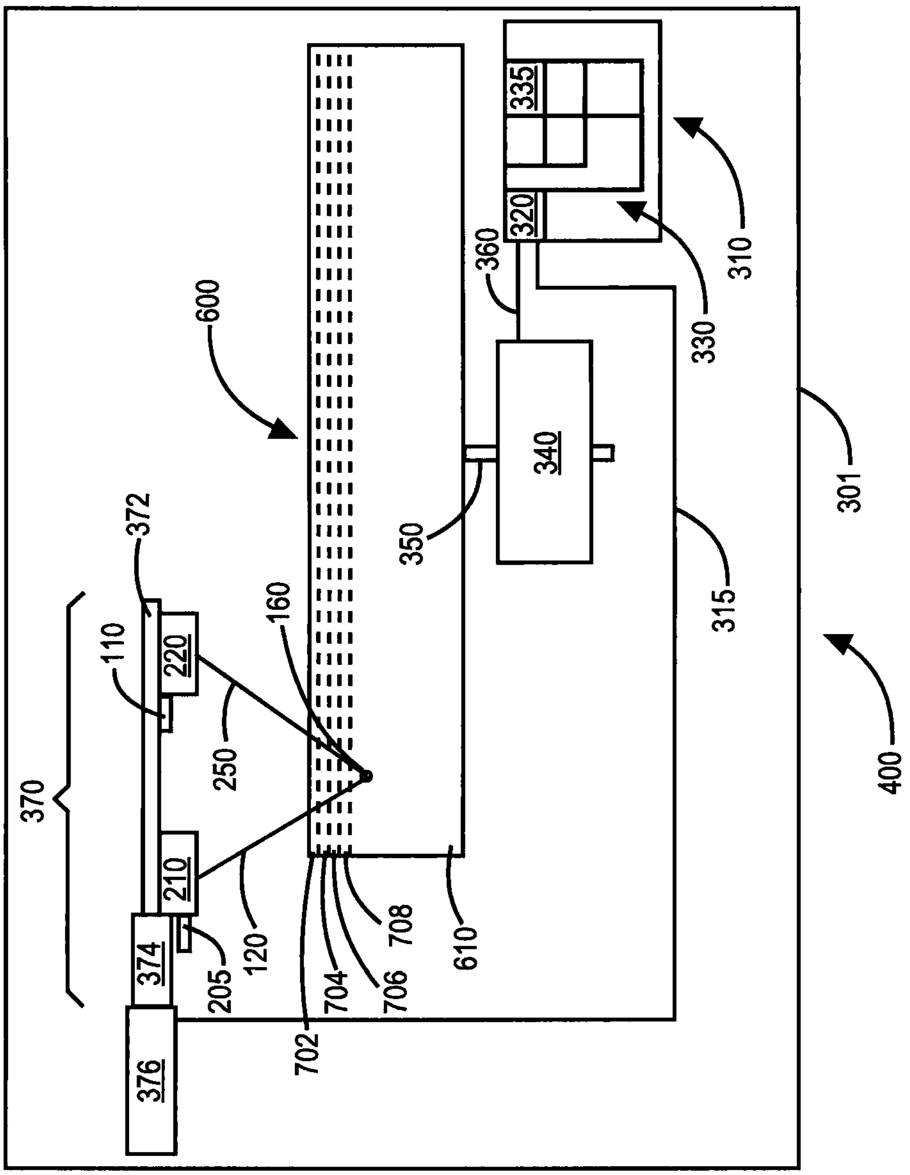
FIG. 4 is a block diagram showing the read/write head using the first lasing device to decode a hologram written to a holographic data storage portion of Applicants' holographic data storage assembly.

Referring now to FIGS. 1 and 2, a holographic data storage system is presented comprising lasing device 205, beam splitter 210, reflective spatial light modulator ("RSLM") 110 (FIGS. 1, 3, 4), holographic storage assembly 600/700, and optical sensor array 230 (FIG. 2) which comprises input screen 220 (FIGS. 2, 3, 4). The light generated by source 205 is split by beam splitter 210 into reference beam 120, and carrier beam 130.

In the illustrated embodiment of FIG. 3, RSLM 110 displays image 140. In certain embodiments, RSLM 110 comprises an assembly comprising a plurality of micro mirrors. In other embodiments, RSLM 110 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

A transmissive spatial light modulator (TSLM) may be used rather than RSLM 110 without departing from the scope of the present discussion. In such embodiments, the TSLM comprises a LCD type device. In certain embodiments, the TSLM is translucent, where information is represented by either a light or a dark pixel on the TSLM display.

Carrier beam 130 picks up image 140 as the light is reflected off RSLM 110 (FIGS. 1, 3, 4) to form reflected data beam 150 comprising image 140. Unreflected reference beam 120 interferes with reflected data beam 150 to form hologram 160 (FIGS. 1, 2, 3, 4). Hologram 160 is encoded as an interference pattern into a holographic data storage medium 610 (FIGS. 3, 4, 6, 7) portion of Applicants' holographic data storage assembly 600 (FIGS. 3, 6) or 700 (FIGS. 4, 7). That interference pattern causes chemical and/or physical changes in the photosensitive medium: a replica of the interference pattern is stored as a change in the absorption, refractive index, or thickness of the photosensitive medium.

FIG. 2 illustrates a holographic data storage system decoding the interference pattern comprising the encoded hologram 160 stored in holographic data storage assembly 600/700. Input screen 220 (FIGS. 2, 3, 4) is disposed a distance away from holographic storage assembly 600/700 sufficient to digitally capture the reconstructed data beam 250 projected upon it. To decode the interference pattern comprising hologram 160 (FIGS. 1, 2, 3, 4), reference beam 120 is incident on the encoded holographic storage assembly 600/700. As the reference beam 120 interferes with the interference pattern 160, a reconstructed data beam 250 is generated, wherein that reconstructed data beam 250 comprises an image 240 resembling the original image 140. Optical sensor array 230 digitally captures the information comprising image 240 on input screen 220.

Referring now to FIG. 3, in certain embodiments lasing device 205, beam splitter 210, RSLM 110 (FIGS. 1, 3, 4), and input screen 220, are disposed within data storage drive 300. In the illustrated embodiment of FIG. 3, data storage drive 300 further comprises housing 301.

In certain embodiments, Applicants' holographic data storage assembly 600 (FIGS. 3, 6) can be removeably disposed within housing 301. In the illustrated embodiment of FIG. 3, holographic data storage assembly 600 is releaseably attached to a drive servo mechanism comprising drive servo 340 and rotatable shaft 350. Drive servo 340 rotates rotatable shaft 350 thereby causing holographic data storage assembly 600 to rotate also.

In the illustrated embodiment of FIG. 3, data storage drive 300 further comprises drive controller 310. Drive controller 310 comprises processor 320, memory 330, and microcode 335 written to memory 330. Drive controller 310 is interconnected with drive servo 340 via communication link 360, and with motor/solenoid 376 via communication link 315. Drive controller 310, using processor 320 and microcode 335, can cause holographic data storage assembly 600 to rotate.

In certain embodiments, memory 330 comprises non-volatile memory, such as and without limitation, battery backed-up RAM; a magnetic disk in combination with the associated software, firmware, and hardware, to read information from, and write information to, that magnetic disk; an optical disk in combination with the associated software, firmware, and hardware, to read information from, and write information to, that optical disk; an electronic storage medium; and the like. By "electronic storage medium," Applicants mean, for example, a device such as a PROM, EPROM, EEPROM, Flash PROM, compactflash, smartmedia, and the like.

In the illustrated embodiment of FIG. 3, data storage drive 300 further comprises member 372 slidably disposed within tubular member 374, which is slidably disposed within motor assembly/solenoid 376. Drive controller 310 can cause solenoid/motor 376 to extend members 374 and 372 outwardly. In the illustrated embodiment of FIG. 3, beam splitter 210, RSLM 110 (FIGS. 1, 3, 4), lasing device 205, and input screen 220 (FIGS. 2, 3, 4), are disposed on member 372. Member 372 in combination with beam splitter 210, RSLM 110, lasing device 205, and input screen 220, comprise holographic read/write head 370.

In certain embodiments, lasing device source 205 emits blue laser light at 405 nm, such as used in Blu-Ray drives, HD-DVD drives, and holographic drives. In certain embodiments, lasing device 205 comprises a gallium nitride laser and emits blue laser light having a wavelength of about 473 nm.

FIG. 3 shows data storage drive 300 being used to encode hologram 160 (FIGS. 1, 2, 3, 4) as an interference pattern in holographic data storage assembly 600. In the illustrated embodiment of FIG. 3, and as further exemplified in FIG. 6, data storage assembly 600 comprises an outer layer 602, an inner layer 604, substrate 606, and a data storage medium 610. Together, outer layer 602 and inner layer 604 comprise a bi-layered optical antireflective coating.

In certain embodiments, data storage medium 610 comprises a holographic data storage medium. In certain embodiments, data storage medium 610 comprises a read only optical data storage medium. In certain embodiments, data storage medium 610 comprises a writeable optical data storage medium. In certain embodiments, data storage medium 610 comprises a re-writeable optical data storage medium.

FIG. 4 shows data storage drive 400 being used to decode the interference pattern comprising hologram 160 encoded in Applicants' holographic data storage assembly 700. In the illustrated embodiment of FIG. 4, and as further exemplified in FIG. 7, holographic data storage assembly 700 comprises an outer layer 702, a middle layer 704, an inner layer 706, substrate layer 708, and data storage medium 610. Together, outer layer 702, middle layer 704, and inner layer 706 comprise a tri-layered optical antireflective coating.

Figure 5:
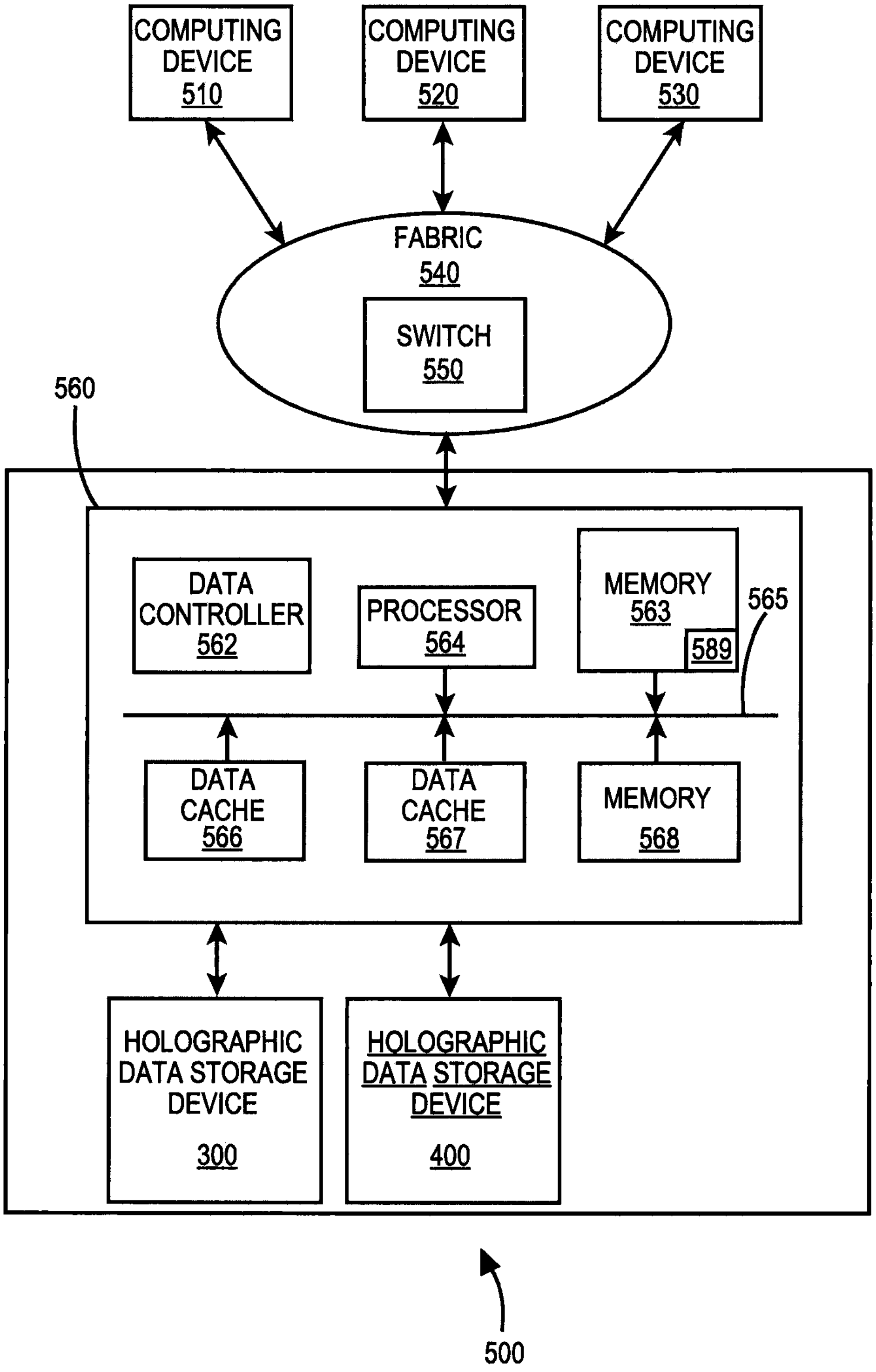
FIG. 5 illustrates one embodiment of Applicants' holographic data storage and retrieval system.

Turning to FIG. 5, an embodiment of a holographic data storage and retrieval system 500 wherein Applicants' invention may be employed is presented. In the illustrated embodiment of FIG. 5, holographic data storage and retrieval system 500 communicates with computing devices 510, 520, and 530. In the illustrated embodiment of FIG. 5, computing devices 510, 520, and 530 communicate with storage controller 560 through a data communication fabric 540. In certain embodiments, data communication fabric 540 comprises one or more data switches 550. In certain embodiments, data communication fabric 540 is a wide area network ("WAN"). In certain embodiments, data communication fabric 540 is a local area network ("LAN"). Further in the illustrated embodiment of FIG. 5, storage controller 560 communicates with one or more holographic encoding/decoding systems. In the illustrated embodiment of FIG. 5, holographic data storage and retrieval system 500 includes holographic data storage systems 300 (FIG. 3) and 400 (FIG. 4).

In certain embodiments, computing devices 510, 520, and 530 are selected from the group consisting of an application server, a web server, a work station, a host computer, or other like devices from which information is likely to originate. In certain embodiments, one or more of computing devices 510, 520, and/or 530 are interconnected with fabric 540 using Small Computer Systems Interface ("SCSI") protocol running over a Fibre Channel ("FC") physical layer. In other embodiments, the connections between computing devices 510, 520, and 530 comprise other protocols, such as Infiniband, Ethernet, Fibre Channel over Ethernet ("FCoE") or Internet SCSI ("iSCSI"). In certain embodiments, switches 550 are configured to route traffic from the computing devices 510, 520, and/or 530 directly to the storage controller 560.

In the illustrated embodiment of FIG. 5, storage controller 560 comprises a data controller 562, memory 563, memory 568, processor 564, and data caches 566 and 567, wherein these components communicate through a data bus 565. In certain embodiments, memory 563 includes instructions 589. In certain embodiments, memory 563 comprises a magnetic information storage medium, an optical information storage medium, an electronic information storage medium, and the like. By "magnetic storage medium," it is meant, for example, a device such as a hard disk drive, floppy disk drive, or magnetic tape. By "optical information storage medium," it is meant, for example, a Digital Versatile Disk ("DVD"), High-Definition DVD ("HD-DVD"), Blu-Ray Disk ("BD"), Magneto-Optical ("MO") disk, Phase-Change ("PC") disk, etc. By "electronic storage media" it is meant, for example, a device such as PROM, EPROM, EEPROM, Flash PROM, compactflash, smartmedia, and the like. In certain embodiments, memory 568 comprises a magnetic information storage medium, and optical information storage medium, an electronic information storage medium, and the like.

In certain embodiments, the storage controller 560 is configured to read data signals from and write data signals to a serial data bus on one or more of the computing devices 510, 520, and/or 530. Alternatively, in other embodiments the storage controller 560 is configured to read data signals from and write data signals to one or more of the computing devices 510, 520, and/or 530 through the data bus 565 and the fabric 540.

In certain embodiments, storage controller 560 converts a serial data stream into a convolution encoded data images. Those data images are transferred to RSLMs and/or TSLMs disposed in one or more holographic data storage systems 300 and/or 400.

In certain embodiments, holographic data storage systems 300 and 400 are located in different geographical places. In certain embodiments, storage controller 560 distributes information between two or more holographic data storage systems in order to protect the information.

Figure 6:
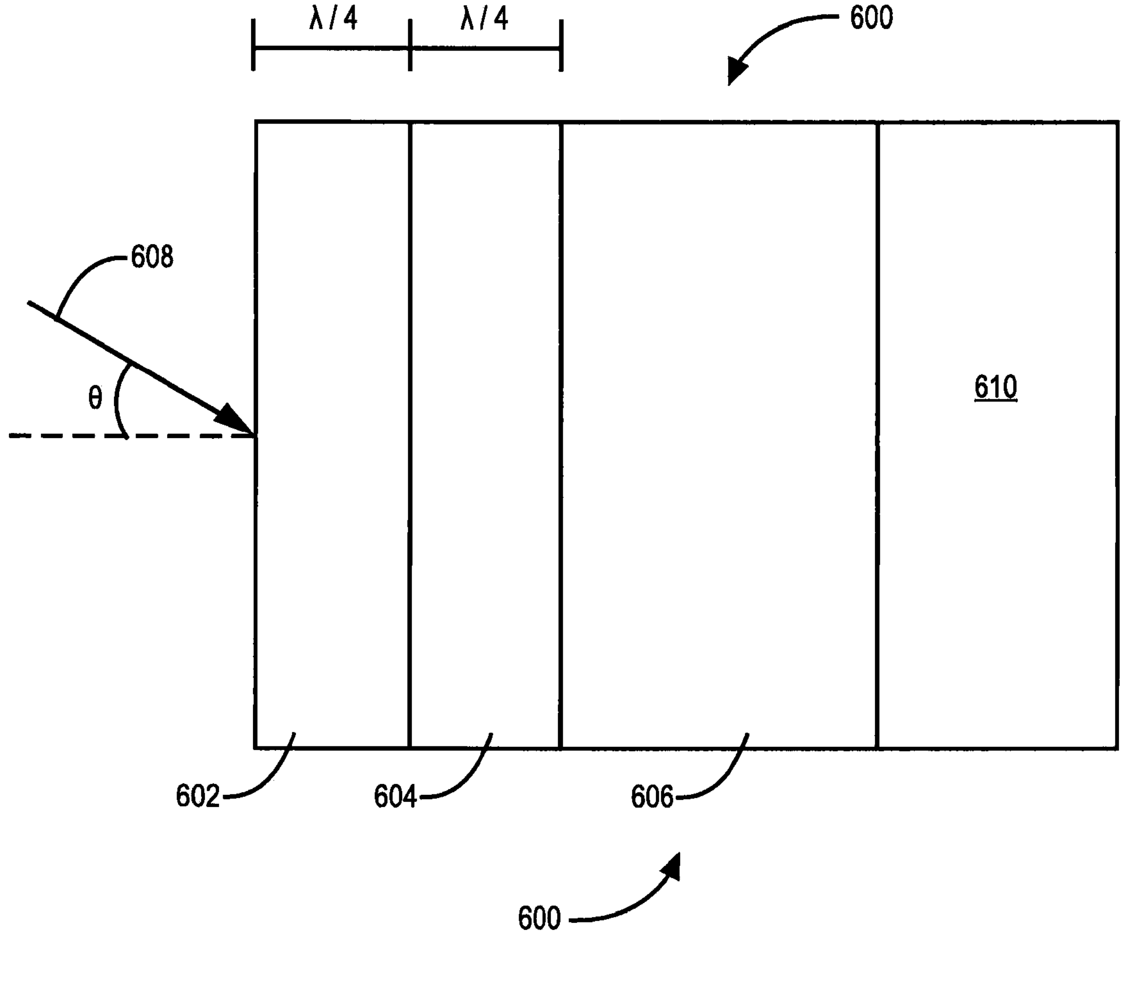
FIG. 6 illustrates a cross section of a portion of one embodiment of Applicants' holographic data storage assembly wherein diamond like carbon is used in a bi-layered antireflective coating.
Figure 7:
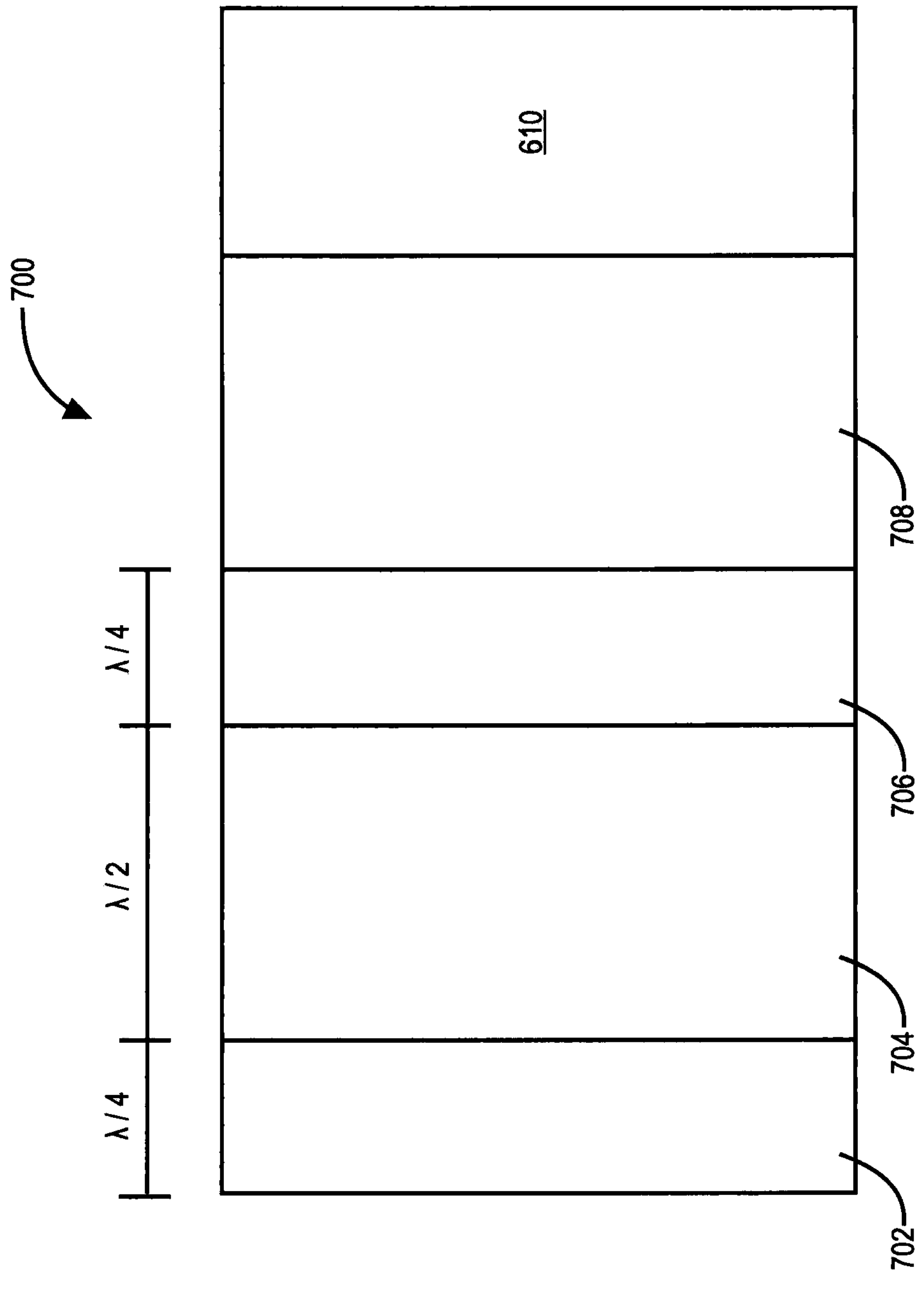
FIG. 7 illustrates a cross section of a portion of a second embodiment of Applicants' holographic data storage assembly wherein diamond like carbon is used in a tri-layered antireflective coating.

Turning to FIG. 6, an exemplary embodiment of Applicants' invention is depicted. Applicants' invention is directed to a holographic data storage assembly having an antireflective coating. As will be understood by one of ordinary skill in the art, in holographic data storage it is desirable to minimize reflectance. However, when electromagnetic waves move between two media, it is well known that generally some of the waves will be reflected and some will be transmitted. The ratio of transmitted to reflected waves depends on the interface conditions. As will be subsequently described in detail, the presented holographic data storage assembly is designed such that the interface conditions eliminate unwanted reflections, thereby improving the read signal-to-noise ratio. Further, the presented antireflective layer is designed to improve the scratch and abrasion resistance of the holographic data storage assembly.

FIG. 6 depicts a cross-sectional side view of a portion of holographic data storage assembly 600, wherein diamond like carbon is used in a bi-layered antireflective coating. As shown in FIG. 6, holographic data storage assembly 600 has a layered construction in which the bi-layered antireflective coating (outer layer 602 and inner layer 604) are disposed upon the outer surface of substrate 606. This substrate 606 resides adjacent to data storage medium 610, where the holograms 160 are actually stored.

By way of example, substrate 606 may comprise an optically transparent material. In certain embodiments, substrate 606 is a glass material. In other embodiments, substrate 606 is a plastic material. In yet other embodiments, substrate 606 is a thermoplastic polymer. In other embodiments, substrate 606 is polycarbonate. In other embodiments, substrate 606 is polymethylmethacrylate ("PMMA") or amorphous polyolefin.

In certain embodiments, holographic data storage assembly 600 has the form of a rotatable disk. In other embodiments, holographic data storage assembly 600 has the form of a rectangular card. In yet other embodiments, holographic data storage assembly 600 has the form of any other shape suitable for holographic data storage.

In the illustrated embodiment of FIG. 6, to read and/or write data to holographic data storage assembly 600, a laser beam 608 is directed toward holographic data storage assembly 600 and data storage medium 610 where holograms 160 are stored. Data storage medium 610 could also be the data storage layer for DVD, HD-DVD, or Blu-Ray Disks. When writing data, laser beam 608 comprises either a data beam, such as data beam 150 (FIGS. 1, 3), or a reference beam 120 (FIGS. 1, 2, 3, 4). When reading data, laser beam 608 is a reference beam, such as reference beam 120.

The angle of incidence, labeled as 0 on FIG. 6, defines an offset of laser beam 608 relative to a line normal to the surface of layer 602. At small angles of incidence, reflection is less of a concern. However, as the angle of incidence increases, the reflected light can degrade system performance. By way of example, the reflected light can increase significantly the noise within the holographic data storage system. This in turn, degrades the signal-to-noise ratio.

This signal-to-noise ratio is improved in the presented embodiment of FIG. 6 by the use of a bi-layered antireflective coating wherein inner layer 604 is diamond like carbon. As will be understood by an individual of ordinary skill in the art, diamond like carbon is an amorphous carbon material which displays some of the unique properties of natural diamonds. The term "diamond like carbon" refers to seven (7) amorphous carbon materials as defined by the Association of German Engineers, VDI, each a mixture of $sp^2$ and $sp^3$ bonded carbon atoms with a hydrogen concentration between 0-80%. Table 1 recites characteristics for the seven (7) forms of diamond-like carbon:

TABLE 1

| Classification of diamond like carbon | | | | | | | |
|---|---|---|---|---|---|---|---|
| | Doping | | | | | | |
| | | | | hydrogenated | | | |
| | hydrogen free | | | | | modified | |
| | | | modified with metal | Predominate C—C— bond | | with metal | with non-metal |
| | sp2 | sp3 | sp2 | sp2 or sp3 | sp3 | sp2 | sp2 |
| Film No. | 2.1 | 2.2 | 2.3 | 2.4 | 2.5 | 2.6 | 2.7 |
| Designation | Hydrogen-free amorphous carbon film | Tetrahedral hydrogen-free amorphous carbon film | Metal-containing hydrogen free amorphous carbon film | Hydrogenated amorphous carbon film | Tetrahedral hydrogenated amorphous carbon film | Metal-containing hydrogenated amorphous carbon film | Modified hydrogenated amorphous carbon film |
| Abbreviation | a-C | ta-C | a-C:Me | a-C:H | ta-C:H | a-C:H:Me | a-C:H:X |

In certain embodiments, inner layer 604 is a form of diamond like carbon having an index of refraction of $N_{604}=2.05$ at a wavelength of 400 nm.

In the illustrated embodiment of FIG. 6, the signal-to-noise ratio is further affected by the material of the outer layer 602. In certain embodiments, outer layer 602 is alumina ($Al_2O_3$). In such embodiments, outer layer 602 has an index of refraction of $N_{602}=1.76$. In certain embodiments, outer layer 602 is cerium fluoride ($CeF_3$). In such embodiments, outer layer 602 has an index of refraction of $N_{602}=1.63$.

When the surface-to-surface separation is small, such as in the context of antireflective coatings, interference from light reflected from the different surfaces will occur. Where a layer of a film has an optical thickness of about one quarter of a wavelength (referred to as a "quarterwave"), light entering the film at normal incidence will cause the wave reflected from the second surface of the film to be exactly one half wavelength out of phase with the light reflected from the first surface. Thus, when the waves interfere at the first surface they will result in a destructive interference. If the amount of light reflected from each surface is the same then no light will be reflected, the two reflected waves having completely cancelled each other out. Therefore, minimal reflectance occurs when the optical thickness of a film is a quarterwave. For holographic data storage assembly 600, having a bi-layered antireflective coating comprising outer layer 602 and inner layer 604, each comprise an optical thickness of a quarterwave, at normal incidence the actual reflectance R where is:

$$R=\{[(N_{604}/N_{602})^2-N_{606}]/[(N_{604}/N_{602})^2+N_{606}]\}^2 \qquad \text{equation (1)}$$

An optimal signal-to-noise ratio occurs when no light is reflected. From equation (2), it can be determined that zero (0) reflectance occurs when:

$$(N_{604}/N_{602})^2=N_{606} \qquad \text{equation (2)}$$

Thus, where the holographic data storage assembly comprises a bi-layered antireflective coating on a substrate, such as Applicants' holographic data storage assembly 600, a minimum reflectance will occur if each layer, outer layer 602 and inner layer 604, comprises a thickness equal to a quarterwave, and wherein inner layer 604 comprises a higher index of refraction then outer layer 602. Thus, in embodiments where substrate 606 comprises polycarbonate, having an index of refraction of $N_{606}=1.595$, and the bi-layered antireflective coating comprises an inner layer 604 of diamond like carbon and an outer layer 602 of cerium fluoride, each layer having an thickness of one quarter of the wavelength, a reflectance R of 0.0017% is obtained. In other embodiments, where alumina is substituted for outer layer 602, a reflectance R of 0.65% is achieved.

Turning to FIG. 7, an exemplary embodiment of Applicants' invention is depicted. In the illustrated embodiment of FIG. 7, Applicants' invention is directed to a holographic data storage assembly 700 comprising a tri-layered antireflective coating. As shown in FIG. 7, holographic data storage assembly 700 comprises a layered architecture in which an antireflective coating (outer layer 702, middle layer 704, and inner layer 706) is disposed on substrate 708. This substrate 708 resides adjacent to data storage medium 610, where the holograms 160 are actually stored. Storage medium 610 could also be the data storage layer for DVD, HD-DVD, or Blu-Ray disks.

Substrate 708 comprises an optically transparent material. In certain embodiments, substrate 708 is a glass material. In other embodiments, substrate 708 comprises a plastic material. In yet other embodiments, substrate 708 comprises a thermoplastic polymer. In other embodiments, substrate 708 comprises polycarbonate. In other embodiments, substrate 708 comprises polymethylmethacrylate ("PMMA") or amorphous polyolefin.

Applicants' holographic data storage assembly minimizes reflectance of incident laser energy through the selection of materials for each layer of the tri-layered antireflective coating, as well as the thickness of each layer. The signal-to-noise ratio, as affected by reflectance, is significantly improved where the middle layer 704 comprises diamond like carbon. In certain embodiments, middle layer 704 comprises specifically a form of diamond like carbon having an index of refraction of $N_{704}=2.05$ at a wavelength of 400 nm. In other embodiments, materials comprising a similar index of refraction as diamond like carbon is used. In such an embodiment, middle layer 704 may comprise zirconia ($ZrO_2$) with an index of refraction of $N_{704}=2.10$. In other such embodiments, middle layer 704 comprises tantalum pentoxide ($Ta_2O_5$) with an index of refraction of $N_{704}=2.15$.

The signal-to-noise ratio is further improved by selecting the materials comprising the outer layer 702 and inner layer 706. In certain embodiments, outer layer 702 comprises alumina. In such embodiments, outer layer 702 has an index of refraction of $N_{702}$=1.76. In certain embodiments, inner layer 706 comprises magnesium fluoride ($MgF_2$). In such embodiments, inner layer 706 has an index of refraction of $N_{706}$=1.38.

An optimal signal-to-noise ratio occurs when no light is reflected. Using Applicants' holographic data storage assembly 700 which comprises a tri-layered antireflective coating on a substrate, maximum destructive interference occurs when inner layer 706 and outer layer 702 comprise a thickness of one quarter the wavelength of the light incident on the tri-layer antireflective coating and middle layer 704 comprises a thickness of one half the wavelength.

While the preferred embodiments of the present invention have been illustrated in detail, it should be apparent that modifications and adaptations to those embodiments may occur to one skilled in the art without departing from the scope of the present inventions. For example, High-Definition DVD ("HD-DVD"), Blu-Ray Disk ("BD"), and Holographic Devices all use the same 405 nm blue laser. Thus, all of these optical storage devices could benefit from the bi-layered and tri-layered antireflective coatings employing diamond-like carbon.

We claim:

1. A data storage assembly comprising:

a data storage medium;

an outer surface comprising an antireflective coating comprising an inner layer and an outer layer disposed on said inner layer, a substrate;

wherein said inner layer is a form of diamond like carbon having an index of refraction of 2.05 at a wavelength of 400 nm;

said inner layer is disposed directly onto said substrate;

said substrate is directly adjacent said data storage medium.

2. The data storage assembly of claim 1, wherein said substrate is polycarbonate.

3. The data storage assembly of claim 1, wherein said outer layer is selected from the group consisting of $CeF_3$ and $Al_2O_3$.

4. The data storage assembly of claim 1, wherein said data storage assembly is designed for use with a lasing device emitting a light comprising a wavelength, wherein a thickness of said inner layer and a thickness of said outer layer are each about one-fourth (¼) of said wavelength.

5. The data storage assembly of claim 4, wherein said wavelength is about 405 nm.

6. The data storage assembly of claim 1, wherein said data storage medium is selected from the group consisting of a holographic data storage medium and an optical data storage medium.

7. A data storage assembly comprising:

a data storage medium;

an antireflective coating comprising an inner layer, a middle layer, and an outer layer;

a substrate;

wherein:

said middle layer is diamond like carbon having an index of refraction of 2.05 at a wavelength of 400 nm; and said inner layer is Magnesium Fluoride;

said Magnesium Fluoride inner layer is disposed directly onto said substrate; and said diamond like carbon middle layer is disposed directly onto said Magnesium Fluoride inner layer.

8. The data storage assembly of claim 7, wherein said substrate is polycarbonate, wherein: said substrate is adjacent said data storage medium.

9. The data storage assembly of claim 7, wherein said data storage assembly is designed for use with a lasing device configured to emit light comprising a wavelength, wherein a thickness of said inner layer and a thickness of said outer layer are each about one-fourth (¼) of said wavelength.

10. The data storage assembly of claim 9, wherein said wavelength is 405 nm.

11. A holographic data storage drive comprising a holographic data storage assembly, wherein said holographic data storage assembly comprises:

a polycarbonate substrate;

an antireflective coating comprising a diamond like carbon layer having an index of refraction of 2.05 at a wavelength of 400 nm;

wherein said diamond like carbon layer is disposed directly onto said substrate.

12. The holographic data storage system of claim 11, wherein an inner layer of said antireflective coating is disposed on said substrate.

13. The holographic data storage system of claim 11, further comprising a plurality of layers including an inner layer disposed between said substrate and an outer layer.

14. The holographic data storage system of claim 13, wherein said inner layer comprises diamond like carbon.

15. The holographic data storage system of claim 14, wherein said outer layer is disposed over said inner layer, and wherein said outer layer is selected from the group consisting of $CeF_3$ and $Al_2O_3$.

16. The holographic data storage system of claim 15, wherein said holographic data storage assembly is designed for use with a lasing device configured to emit laser light comprising a wavelength, wherein a thickness of said inner layer and a thickness of said outer layer are each about one-fourth (¼) of said wavelength.

17. The holographic data storage system of claim 16, wherein a wavelength of said laser light is about 405 nm.

18. The holographic data storage system of claim 13, wherein said plurality of layers includes a middle layer disposed over said inner layer, wherein said outer layer is disposed over said middle layer.

19. The holographic data storage system of claim 18, wherein said outer layer comprises $Al_2O_3$.

20. The holographic data storage system of claim 19, wherein said middle layer is selected from the group consisting of diamond like carbon, $ZrO_2$, and $Ta_2O_5$.

21. The holographic data storage system of claim 20, wherein said inner layer comprises $MgF_2$.

22. The holographic data storage system of claim 21, wherein said holographic data storage assembly is designed for use with a lasing device configured to emit light comprising a wavelength, wherein a thickness of said inner layer and a thickness of said outer layer are each about one-fourth (¼) of said wavelength, wherein and wherein a thickness of said middle layer is about one-half (½) of said wavelength.

23. The holographic data storage system of claim 22, wherein said wavelength is 405 nm.

* * * * *